US008631824B2

(12) United States Patent
Pelkey et al.

(10) Patent No.: US 8,631,824 B2

(45) Date of Patent: Jan. 21, 2014

(54) APPARATUS, METHOD AND SYSTEM FOR DISPENSING LIQUID PRODUCTS TO TWO OR MORE APPLIANCES

(75) Inventors: John Thomas Pelkey, St. Paul, MN (US); Richard Jondall Mehus, Richfield, MN (US); Ryan Jacob Urban, Mahtomedi, MN (US); Nicholas Donald Parent, St. Paul, MN (US); Scott Russell Limback, St. Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 506 days.

(21) Appl. No.: 12/868,081

(22) Filed: Aug. 25, 2010

(65) Prior Publication Data

US 2012/0048306 A1 Mar. 1, 2012

(51) Int. Cl.
*F16K 11/07* (2006.01)

(52) U.S. Cl.
USPC ........ 137/625.42; 137/883; 137/889; 134/36; 68/17 R; 239/353; 239/444; 239/562; 222/1; 222/144.5; 222/145.1

(58) Field of Classification Search
USPC ............ 222/1, 129.2, 132–136, 144.5, 145.1, 222/401, 152, 571; 134/36; 68/17 R; 137/872, 883, 101.19, 625.42, 137/625.46–625.47, 889; 239/76, 140–141, 239/353, 436–449, 550–551, 562
See application file for complete search history.

(56) References Cited

U.S. PATENT DOCUMENTS

| | | | | | |
|---|---|---|---|---|---|
| 3,643,688 | A | * | 2/1972 | Meinert | 137/556 |
| 5,551,473 | A | * | 9/1996 | Lin et al. | 137/218 |
| 5,558,783 | A | * | 9/1996 | McGuinness | 210/761 |
| 5,590,686 | A | * | 1/1997 | Prendergast | 137/597 |
| 5,626,291 | A | | 5/1997 | Flinn et al. | |
| 5,915,592 | A | * | 6/1999 | Mehus et al. | 222/1 |
| 6,098,646 | A | * | 8/2000 | Hennemann et al. | 137/101.19 |
| 6,293,294 | B1 | | 9/2001 | Loeb et al. | |
| 6,460,565 | B1 | * | 10/2002 | Titus | 137/487 |
| 6,599,277 | B2 | | 7/2003 | Neubert | |
| 6,619,318 | B2 | | 9/2003 | Dalhart et al. | |
| 6,698,297 | B2 | | 3/2004 | Gysling | |
| 6,749,027 | B1 | | 6/2004 | Crabtree et al. | |

(Continued)

FOREIGN PATENT DOCUMENTS

| | | | |
|---|---|---|---|
| JP | 2004-524230 | A | 8/2004 |
| JP | 2010-522676 | A | 7/2010 |
| WO | WO 96/41956 | A1 | 12/1996 |
| WO | WO 00-39021 | A1 | 7/2000 |

(Continued)

OTHER PUBLICATIONS

JP 2004-524230—Johnson Diversey Inc.—English Translation.

(Continued)

*Primary Examiner* — Paul R Durand
*Assistant Examiner* — Andrew P Bainbridge
(74) *Attorney, Agent, or Firm* — McKee, Voorhees & Sease, P.L.C.

(57) ABSTRACT

An apparatus, method and system provides for dispensing liquid products to two or more appliances. Liquid diluent is communicated through an anti-siphon valve (64) connected in fluid communication to an aspirator (14). A mixed solution from the aspirator (14) is communicated to a distribution valve (36) for directing flow of a liquid product to two or more appliances using a single aspirating dispenser (12).

8 Claims, 3 Drawing Sheets

(56) References Cited

U.S. PATENT DOCUMENTS

| | | | | |
|---|---|---|---|---|
| 6,936,176 | B1 | 8/2005 | Greene, III et al. | |
| 7,059,541 | B2 | 6/2006 | Jensen et al. | |
| 7,083,157 | B2 * | 8/2006 | Kingsford et al. | 251/109 |
| 7,487,795 | B2 | 2/2009 | Sand | |
| 7,615,122 | B2 | 11/2009 | Mehus et al. | |
| 2006/0210430 | A1 | 9/2006 | Lark et al. | |
| 2006/0243743 | A1 * | 11/2006 | Mehus et al. | 222/133 |
| 2008/0173705 | A1 | 7/2008 | Girard et al. | |
| 2008/0190421 | A1 | 8/2008 | Zitting | |
| 2009/0004068 | A1 * | 1/2009 | Frisch | 422/140 |

FOREIGN PATENT DOCUMENTS

| | | | |
|---|---|---|---|
| WO | WO 00-75066 | A1 | 12/2000 |
| WO | WO 2005039290 | A1 | 5/2005 |
| WO | WO 2008083896 | A1 | 7/2008 |

OTHER PUBLICATIONS

JP 2010-522676—S. C. Johnson & Son, Inc.—English Translation.

Ecolab USA Inc. et al., PCT/IB2011/053704—Notification of Transmittal of the International Search Report and the Written Opinion of the International Searching Authority, mailed May 1, 2012.

* cited by examiner

APPARATUS, METHOD AND SYSTEM FOR DISPENSING LIQUID PRODUCTS TO TWO OR MORE APPLIANCES

BACKGROUND OF THE INVENTION

1. Field of the Invention

This invention relates generally to an apparatus, method and system configured for dispensing liquid products to two or more appliances, and more particularly to an apparatus, method and system for aspirated dispensing of liquid products to two or more appliances using a single dispenser.

2. Description of the Prior Art

Many cleaning and sanitizing processes, whether laundering, warewashing or the like, have as a significant portion of their operating expense the cost of the equipment or the dispenser of the formulated aqueous products. For example, hospitality businesses such as hotels, hospitals, restaurants, and the like use multiple pieces of equipment or multiple dispensers for dispensing liquid detergents and cleaning solutions to multiple appliances for laundry and warewashing. These processes often use multiple chemicals to increase the effectiveness of the cleaning and sanitizing process. To achieve these objectives, many efforts have been made to minimize or reduce the equipment and associated costs for calibrating, controlling and measuring the dilution and delivery of concentrated liquid products to an appliance, and more specifically to a set of appliances. These dispensers vary from, on one hand, simply manually measuring and mixing to utilizing a computer-controlled dilution device. One common dispensing device combines, under mixing conditions, a flow of concentrate and then a flow of diluent. The flow of liquid diluent can be directed through an aspirator such that, as the diluent passes through the aspirator, a negative pressure arises inside the aspirator drawing the liquid concentrate into the aspirator to mix with the liquid diluent. Both Copeland, et al., U.S. Pat. No. 5,033,649 and Freeze, U.S. Pat. No. 4,817,825 and Mehus, et al., U.S. Pat. No. 5,915,592 disclose dispensers having aspirators for diluting liquid concentrates to deliver liquid products in this general way. Such aspirator-type dispensers have been used for diluting and dispensing a liquid concentrate.

In a number of applications, there is a desire to minimize equipment costs by using a single dispenser to supply multiple chemicals to multiple appliances. In the case of aspirated dispensing of multiple chemicals to multiple appliances, significant challenges exist, including the downstream distribution and handling of the chemicals in such a way so as to not impair or affect the aspirator's performance, yet still allow multiple chemicals to be fed to two or more appliances using a single aspirating dispenser.

The present invention addresses these problems and provides for an apparatus, method and system configured for dispensing liquid products to two or more appliances using a single aspirating dispenser.

BRIEF SUMMARY OF THE INVENTION

In one embodiment the invention is an aspirating dispensing system configured for dispensing liquid products to two or more appliances. The system includes an aspirator having a diluent inlet port for receiving a stream of liquid diluent, at least one product inlet port for receiving a liquid product and an outlet port for dispensing the liquid product. The system also includes a distribution valve for directing flow of a liquid product to one of the two or more appliances. The valve has an inlet connected downstream of and in liquid communication to the inlet port of the aspirator and an outlet connected in liquid communication to an appliance.

In another embodiment, the invention is an apparatus for dispensing liquid products to two or more appliances. The apparatus includes a boost pump having a pump inlet for receiving a stream of liquid diluent at a source pressure and a pump outlet for delivering the stream of liquid diluent at an elevated pressure. An aspirator having a diluent inlet port receives the stream of liquid diluent at the elevated pressure and includes at least one product inlet port for receiving a liquid product and an outlet port for dispensing the liquid product. A distribution valve directs the liquid product to one of the two or more appliances. The valve has an inlet connected downstream of and in liquid communication to the outlet port of the aspirator and an outlet connected in a liquid communication to an appliance.

In another embodiment, the invention is a method for dispensing liquid products to two or more appliances. The method includes providing an aspirator having a diluent inlet port for receiving a stream of liquid diluent, a plurality of product inlet ports for receiving a liquid product and an outlet port for dispensing a liquid product. A stream of liquid diluent is passed at an elevated pressure through the diluent inlet port of the aspirator for aspirating a liquid product from a liquid product source into the aspirator. The liquid product is dispensed from the aspirator to a distribution valve and the outlet port of the aspirator is placed in fluid communication with one of the two or more appliances using the distribution valve.

BRIEF DESCRIPTION OF THE DRAWINGS

While the Specification concludes with the claims particularly pointing out and distinctly claiming the invention, it is believed that the present invention will be better understood from the following description taken in conjunction with the accompanying drawings, in which:

DETAILED DESCRIPTION OF THE PREFERRED EMBODIMENTS

Figure 1:
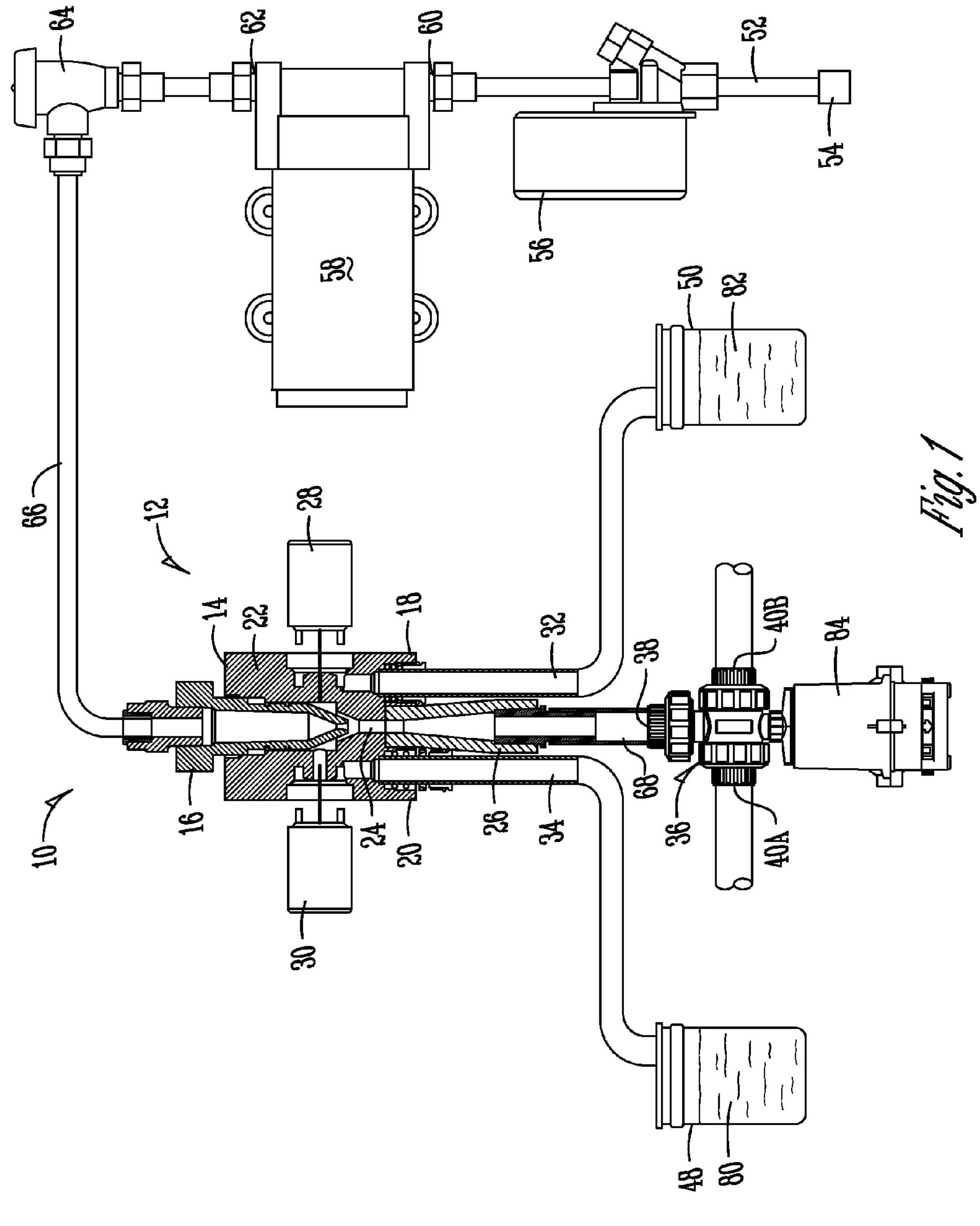
FIG. 1 is a schematic representation of the present invention.

Referring to the drawings, wherein like numerals represent like parts throughout the several views, there is generally disclosed at 10 a dispensing system. The dispensing system 10 includes an aspirator assembly 12. The aspirator assembly 12 includes an aspirator 14. The aspirator assembly 12 also includes four solenoid valves 28-31 (solenoid valves 29 and 31 not shown). The number of solenoid valves on aspirator assembly 12 could be reconfigured according to need. Aspirator assembly 12 could be configured to include less than four solenoid valves. Aspirator assembly 12 could also be configured with two solenoid valves instead of the four illustrated. Other configurations for a number of solenoid valves 28-31 on aspirator assembly 12 are contemplated as circumstances may suggest or rendered expedient. Aspirator assembly 12 also includes a diluent inlet port 16. The diluent inlet port 16 is connected in fluid communication with passageway 24 within the body 22 of the aspirator 14 as illustrated in FIG. 1. Aspirator assembly 12 also includes four product inlet ports 18-21 (product inlet ports 19 and 21 not shown). Passageway 24 within aspirator body 22 is in fluid communication with outlet port 26. A similar multi-port aspirator is disclosed in application Ser. No. 11/206,618 entitled "METHOD AND APPARATUS FOR DISPENSING A USE SOLUTION" filed on Aug. 18, 2005 and is hereby incorporated by reference in its entirety.

Product inlet ports 18-21 (and two not shown) of aspirator assembly 12 are connected in fluid communication to liquid product containers 48-51 (product containers 49 and 51 not shown) via liquid product conduits 32-35 (conduits 33 and 35 not shown).

While the previously described dispensing system 10 is preferred to be used in the present invention, it is understood that other suitable assemblies may also be used in combination with the dispensing system 10.

Referring to FIG. 1, there is shown one embodiment utilizing one dispensing system of the present invention. Water or other suitable diluents are provided by a water or diluent source 54 with a source pressure to a diluent intake conduit 52. The source pressure of the liquid diluent is typically from 30 psi to 50 psi, or the pressure commonly associated with a domestic or principality water source. The diluent intake conduit 52 is connected in fluid communication to an inlet 60 of a boost pump 58. The boost pump 58 raises the pressure of the liquid diluent from the source pressure to a suitable elevated pressure for operating aspirator 14. The outlet 62 of the boost pump 58 is connected in fluid communication to an anti-siphon valve 64 positioned in the flow path of conduit 66. Conduit 66 is in-turn connected in fluid communication to diluent inlet port 16 of aspirator assembly 12.

For purposes of illustrating the flow of liquid diluent and liquid product through the aspirator assembly, aspirator assembly 12 shown in FIG. 1 is illustrated in cross-sectional view. As previously indicated, aspirator assembly 12 includes a diluent inlet port 16 connected in liquid communication to anti-siphon valve 64. The diluent inlet port 16 is also connected in fluid communication to the passageway 24 within aspirator body 22. Product inlet ports 18-21 (19 and 21 not shown) are moved into fluid communication with passageway 24 within aspirator body 22 by activation of solenoid valves 28-31 (29 and 31 not shown). The aspirator body 22 includes an outlet port 26 connected in fluid communication to the passageway 24. The aspirator 14 also includes four liquid product conduits 32-35 (33 and 35 not shown) operatively connected to each of the product inlet ports 18-21. Each liquid product conduit 32-35 is also connected in fluid communication to a liquid product container 48-51 (49 and 51 not shown). Upon activation of a solenoid valve 28-31 liquid product 80 or 82 (and two not shown) are drawn into the passageway 24 within aspirator body 22 and aspirated out through outlet port 26, and in-turn communicated to an appliance for use. Further details describing the various features, functions and structure of the aspirator assembly 12 are included in application Ser. No. 11/206,618 incorporated by reference herein.

As also illustrated in FIG. 1, a diverter valve 36 is connected in fluid communication to outlet conduit 68. The diverter valve 36 includes an inlet 38 operatively connected to the outlet conduit 68, and a pair of outlets 40A-B connected in fluid communication to outlet conduit 69A and 69B respectively (shown in FIG. 2). The diverter valve 36 may include an actuator 84 for placing one of the outlets 40A-B in fluid communication with the inlet 38. For example, the diverter valve 36 may be a three-way diverter valve being actuated by the solenoid 84 between open and closed positions thereby moving one of the outlets 40A-B into fluid communication with the inlet 38, depending upon which leg of the outlet conduit 69A and 69B it is desired to dispense liquid product therethrough.

In operation, a liquid, such as a liquid diluent, is communicated from a liquid or diluent source 54 through a diluent intake conduit 52. The liquid diluent passes through a water solenoid valve 56 and enters the boost pump 58 through inlet 60 and exits the boost pump 58 through outlet 62 at a pressure elevated from the source pressure associated with the diluent source 54. In one aspect of the invention the boost pump 58 raises the pressure of the liquid diluent from the source pressure associated with the diluent source 54 to a suitable elevated pressure for operating aspirator assembly 12. Liquid diluent is communicated through a conduit to an anti-siphon valve 64, such as an atmospheric pressure breaker illustrated in FIG. 2 or vacuum pressure breaker illustrated in FIG. 3. The liquid diluent is communicated from the anti-siphon valve 64 through conduit 66 to the diluent inlet port 16 of the aspirator assembly 12. Thus, liquid diluent from the anti-siphon valve 64 is communicated through conduit 66 and into the passageway 24 within aspirator body 22 upon activating solenoid valve 56 to the open position. A suitable controller, not shown in FIG. 1, may be connected in electronic communication with solenoid valves 28-31 (29 and 31 not shown) associated with aspirator assembly 12. A control signal communicated from the controller to any one of the solenoid valves 28-31 actuates the valve between open and closed positions. In the open position, the product inlet port associated with the solenoid valve being actuated to the open position is brought into communication with the passageway 24 in aspirator body 22 illustrated in FIG. 1. As each product inlet port 18-21 (19 and 21 not shown) is connected in fluid communication with a liquid product container 48-51 (49 and 51 not shown), actuation of the solenoid valve associated with the liquid product container to an open position places the liquid product 80 or 81 within the liquid product container in fluid communication with the passageway 24 within the aspirator body 22 of aspirator assembly 12. By operation of an aspirator, which is well-known in the art, one of the liquid products 80-83 (liquid product 81 and 83 not shown), such as a liquid concentrate, assuming a solenoid valve is activated, will be drawn from a liquid product container 48-51 through liquid product conduits 32-35, A flow meter (not shown) may also be placed in the flow path of the liquid product conduits 32-35 to monitor an amount of the liquid product 80-83 being drawn from liquid product containers 48-51. The particular liquid product being drawn from the liquid product containers 48-51 is communicated through liquid product conduits 32-35 into the aspirator assembly 12 when a solenoid valve 28-31 is actuated. The liquid product 80-83 is then dispensed, along with the liquid diluent, as a mixed solution via the outlet port 26, through outlet conduit 68 and into diverter valve 36.

The same or another suitable controller, not shown in FIG. 1, may be connected in electronic communication with diverter valve 36. As shown, diverter valve 36 comprises a three-way diverter valve. Diverter valve 36 includes a first open position for diverting liquid product through the inlet 38 and through one of the outlets 40A, and a second open position for diverting liquid product through the inlet 38 and the other outlet 40B. An actuator 84 receives a signal from the controller and moves the valve 36 to the first or second open position to place one of the outlets 40A-B in fluid communication with the inlet 38. Liquid product is then communicated through conduit 69A and 69B to an end use location such as an appliance.

Figure 2:
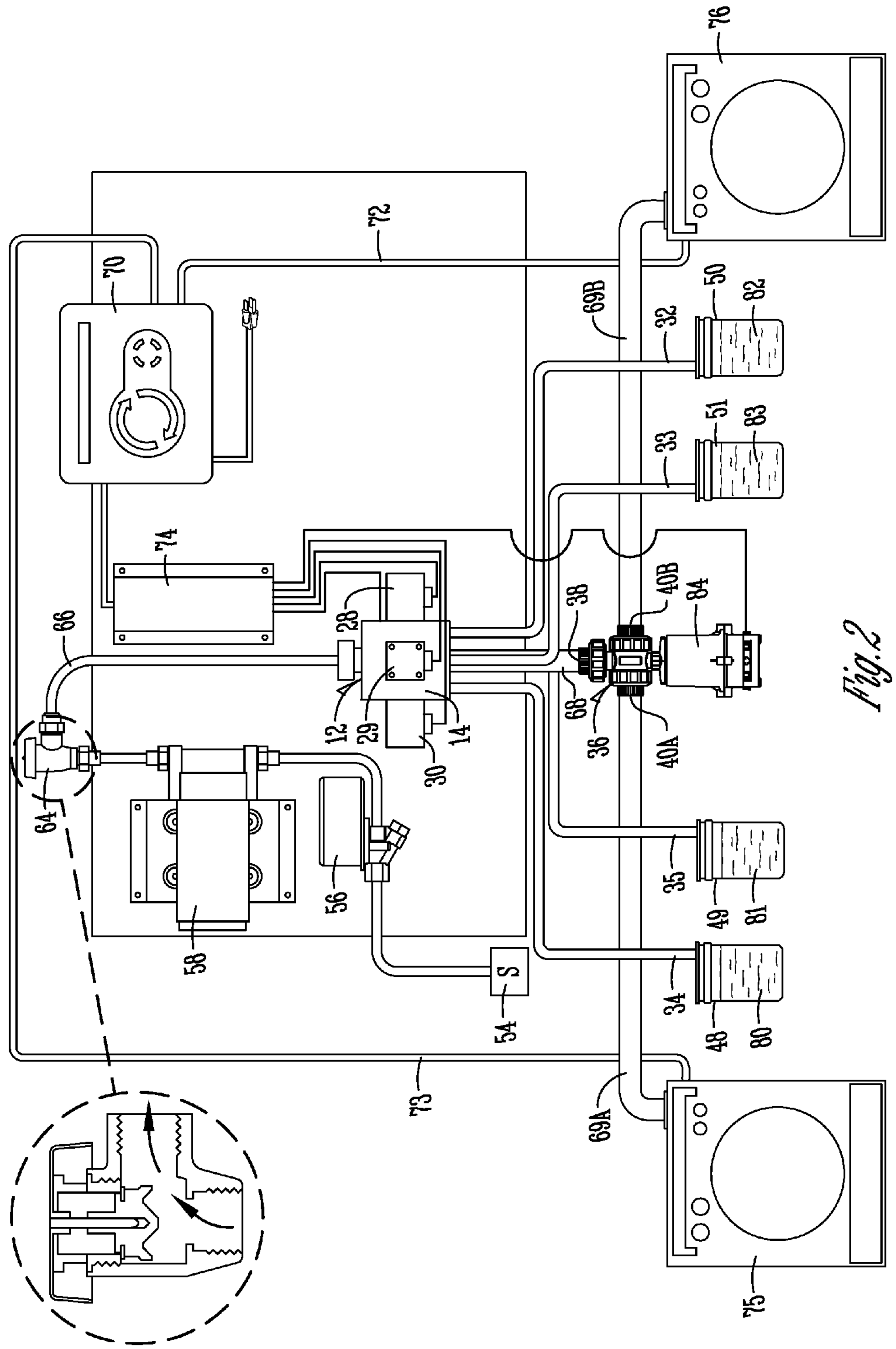
FIG. 2 is a schematic representation of the present invention and incorporated into a commercial laundry system.

Referring now specifically to FIG. 2, there is shown a dispensing system 10 of the present invention incorporated into a commercial laundry system. The dispensing system 10 could also be incorporated into a commercial warewashing system. Other cleaning and sanitizing systems are contemplated as circumstances may suggest or rendered appropriate by incorporation of the present invention. The dispensing system 10 is configured to dispense multiple liquid products to two or more appliances using a single aspirating dispenser 14. As illustrated in FIG. 2, the four liquid product inlet ports 18-21 (21 not shown) of aspirator assembly 12 are connected in liquid communication to four liquid products containers 48-51 (containing the four liquid products 80-83 to be dispensed) via liquid product conduits 32-35. The liquid products 80-83 may include, in the case of a commercial laundry system as shown, such products as an alkaline, a detergent, a chlorine bleach, a starch, a softener, an acid, or an antichlor. Although specific liquid products are specified, the present invention contemplates that the liquid products 80-83 contained in liquid product containers 48-51 may comprise any number of liquid products selected from any detergents, sour/softener or souring agents, and/or chlorine bleach.

A suitable controller 70 provides a voltage connection to solenoid valves 28-31 and diverter valve 36 through an electrical connection 74. The controller 70 receives a signal via connection 72-73 from appliance 75 and 76, respectively. As previously indicated, the appliance 75-76 shown in FIG. 2 can be a laundry or warewashing machine, or like appliance. The outlet conduit 68 of aspirator assembly 12 is connected in fluid communication to the inlet 38 of diverter valve 36. One outlet 40A of diverter valve 36 is connected in fluid communication to appliance 75 via outlet conduit 69A and the other outlet 40B of diverter valve 36 is connected to appliance 76 via outlet conduit 69B. The appliance 75 and/or 76 sends a signal to controller 70 based on the desired liquid product being requested, and an instruction is sent from the controller 70 through electrical connection 74 to actuate one of the solenoid valves 28-31 associated with the aspirator assembly 12. The requested liquid product 80-83 is drawn from a respective liquid product container 48-51 and through the aspirator assembly 12. The liquid product and liquid diluent received from the liquid diluent source 54 are dispensed together through outlet port 26, outlet conduit 68 and into the diverter valve through inlet 38. When the control signal for actuating solenoid valves 28-31 is communicated from the controller 70 a separate or same control signal is also communicated to the diverter valve 36 for actuating the diverter valve to one of the open positions. For example, depending upon the appliance 75 or 76 requesting a desired liquid product 80-83, the diverter valve 36 is actuated to one of the open positions to place the inlet 38 of the diverter valve in fluid communication with one of the outlets 40A-B of the diverter valve. In one position the outlet 40B is actuated to a position where outlet 40B is placed in fluid communication with the inlet 38 of diverter valve 36 so that liquid product is communicated from aspirator assembly 12 through conduit 68, diverter valve 36 and outlet conduit 69B into appliance 76. Similarly, in the case where appliance 75 is requesting product, controller 70 issues an instruction for one of the solenoid valves 28-31 to open so that the requested liquid product 80-83 may be drawn through aspirator 14 and dispensed through outlet conduit 68 into diverter valve 36. The diverter valve 36 is also actuated so that outlet 40A is moved into fluid communication with the inlet 38 of the diverter valve 36 whereby a liquid product 80-83 is communicated through outlet conduit 68, diverter valve 36 and outlet conduit 69A into appliance 75. In the case where both appliances 75 and 76 are requesting the same liquid product or a different product at the same time, diverter valve 36 receives instruction from controller 70 to move the valve to a position where one outlet 40A or 40B is in an open position relative to the inlet 38. Liquid product communicated from aspirator 14 travels through outlet conduit 68 into diverter valve 36, and through the desired outlet conduit 40A or 40B and into one of the appliances 75 or 76 requesting product. The diverter valve 36 is then switched to its other open position, by instruction from controller 70, so that product is dispensed to the other appliance. In the case where the dispensing system 10 is occupied by dispensing product to one appliance while another is requesting product, the controller 70 could be configured to actuate dispensing to the requesting appliances in a sequential manner, such as based on a hierarchal protocol or process. The controller 70 could also be configured to instruct one of the two or more appliances requesting product the same time as another to pause using a chart stop function, which is well known in the art. In this manner, dispensing system 10 is able to dispense multiple liquid products 80-83, such as chemicals or liquid concentrates, through a single dispenser into multiple appliances 75 and 76 using a diverter valve 36 connected downstream in fluid communication to the outlet conduit 68 of aspirator assembly 12.

Because dispensing is accomplished by aspirating liquid product through aspirator assembly 14, it is preferred that a two-position normally open and fail open valve be used in combination with an anti-siphon valve 64 that is preferably an atmospheric vacuum breaker as illustrated in FIG. 2. Both an atmospheric vacuum breaker and two-position normally open and fail open valve are well known to those in the art and commercially available. The atmospheric vacuum breaker allows liquid diluent to be communicated from diluent source 54 through conduit 66 into aspirator assembly 12 without being drawn back into the diluent source 54, such as in the case where a negative pressure field develops in the conduit prior to the atmospheric vacuum breaker 64. Similarly, liquid diluent elevated to a pressure for operating aspirator 14 is able to pass through atmospheric vacuum breaker 64 without experiencing significant pressure drops so that as the liquid diluent travels through conduit 66 into aspirator assembly 14 the pressure of the liquid is sufficient to operate the aspirator properly. With the dispensing system illustrated in FIG. 2, it is preferred that diverter valve 36 is a two-position normally open and fail open valve so that the aspirating dispensing system can be used in combination with an atmospheric vacuum breaker 64. Because the two-position normally open and fail open valve is always in an open position, the valve 36 is suitable for use downstream of an aspirating dispenser. Furthermore, the valve 36 is preferably a large orifice valve, one with a large flow factor (Cv) or low restriction, to help prevent significant drops in the pressure, typically associated with smaller orifice valves or those with smaller Cv's, from occurring and thereby affecting or impairing the performance of the aspirator 14. It is critical that the vacuum pressure within the aspirator be maintained at a consistent vacuum pressure so that the aspirator operates effectively. Significant pressure drops downstream of the aspirator can cause the aspirator to fail or the vacuum to be lost within passageway 24 of aspirator body 22, and thereby impair or stop the aspiration of liquid product 80-83 through the aspirator into the requesting appliance 75 or 76.

Figure 3:
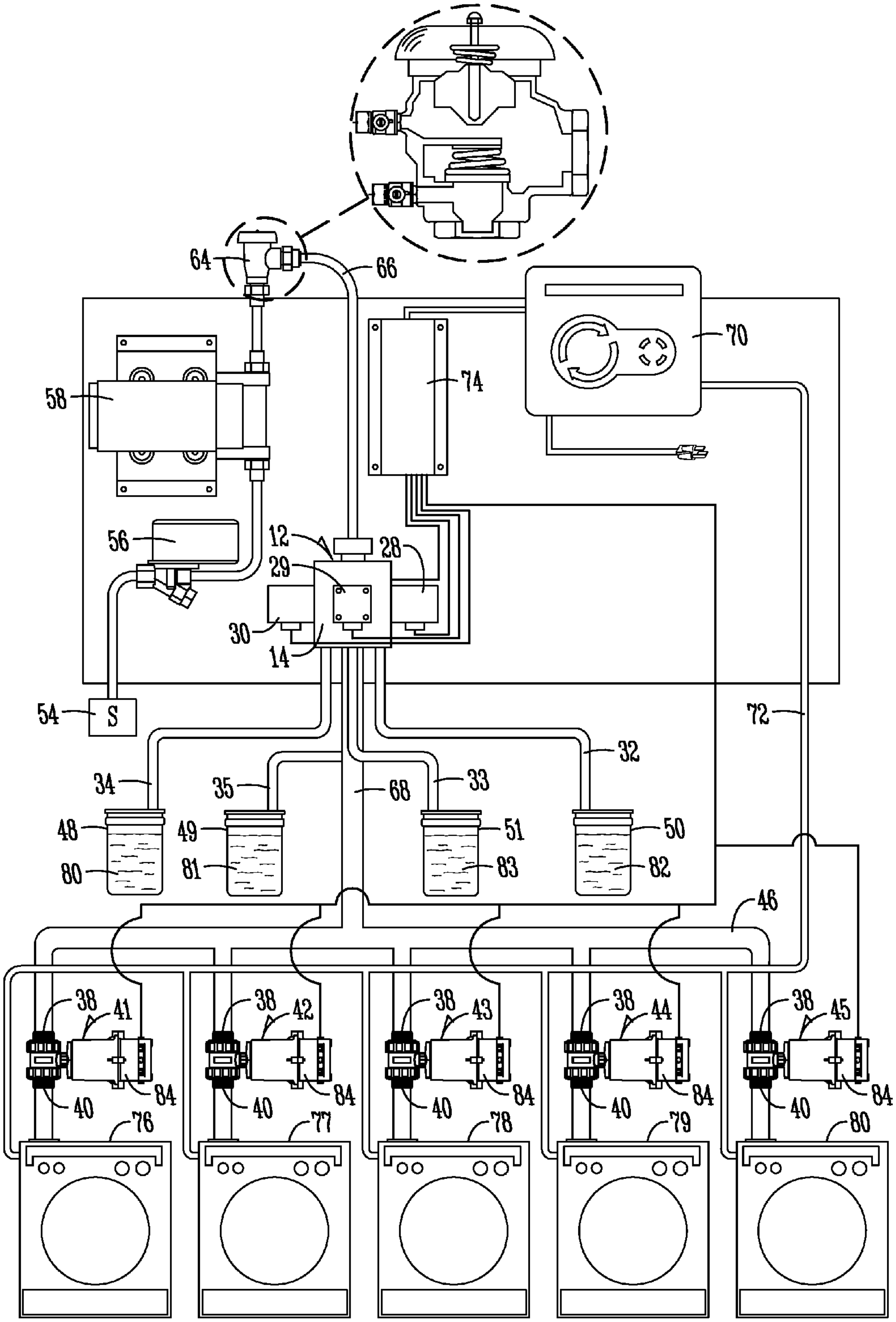
FIG. 3 is another schematic representation of the present invention and incorporated into a commercial laundry system.

Referring now specifically to FIG. 3, there is shown a dispensing system 10 of the present invention incorporated into a commercial laundry or warewashing system, or the like. The dispensing system 10 allows a single aspirating dispenser 14 to service two or more appliances as shown. To accommodate multiple appliances 76-80 being supplied liquid product 80-83 from a single aspirator 14, the outlet conduit 68 connected in fluid communication to the outlet port 26 of aspirator 14 is also connected in fluid communication to a distribution manifold 46. The distribution manifold 46 is connected in fluid communication to appliances 76-80 respectively. Placed within the flow path between the distribution manifold 46 and each appliance is a valve 41-45. Each valve 41-45 is actuated between open and closed positions by an actuator 84. Each valve 41-45 is also connected to electrical connection 74 and receives operating instructions from controller 70 connected to electrical connection 74. As described above, each appliance 76-80 is also electrically connected to controller 70 via connection 72. Operating instructions from each appliance 76-80 are communicated through connection 72 to controller 70, which in-turn provides instructions to electrical connection 74. These instructions are communicated from electrical connection 74 to valves 41-45. Instructions from the electrical connection 74 actuate each of the valves 41-45 between open and closed positions. In a preferred form, valves 41-45 comprise normally closed and fail closed valves. Thus, each valve 41-45 is normally closed until the actuator 84 is energized to open it. Similarly, each valve, if power to the actuator 84 fails, closes or fails closed. Depending upon the appliance 76-80 requesting liquid product, a signal is communicated from the appliance to the controller 70 via connection 72. The controller 70 issues instructions through electrical connection 74 to the aspirator assembly 14 and the valve 41-45 associated with the appliance 76-80 requesting liquid product. The solenoid valve 28-31 associated with the liquid product 80-83 being requested is actuated to an open position to move the passageway 24 within aspirator body 22 into fluid communication with the liquid product container 48-51 having the requested liquid product 80-83. Similarly, instructions from the electrical connection are communicated to the valve 41-45 associated with the appliance 76-80 requesting the liquid product 80-83 to actuate the valve to an open position. Liquid diluent is communicated from the liquid diluent source 54 through conduit 66, elevated to a pressure suitable for operating the aspirator assembly 12 and communicated through anti-siphon valve 64. The anti-siphon valve 64 is preferably a vacuum pressure breaker which are known in the art and commercially available. The vacuum pressure breaker operates under constant pressure or the pressure of the liquid diluent being communicated from pump 58. The liquid diluent travels through conduit 66, vacuum pressure breaker 64 and into the diluent inlet port 16 of aspirator 14. A liquid product 80-83 is drawn from liquid product container 48-51 through liquid product conduit 32-35 and into aspirator 14. The liquid diluent and liquid product dispense together through the outlet port 26 of aspirator 14 and are communicated through outlet conduit 68 into distribution manifold 46. The liquid product continues through distribution manifold, through one of the open valves 41-45 and into the appliance 76-80 requesting the liquid product. If more than one appliance 76-80 is requesting the same liquid product or different liquid product at the same time, the respective valves 41-45 are sequentially actuated to the open position so that liquid product may flow through the distribution manifold 46 and into each of the requesting appliances 76-80 in a sequential manner. The dispensing system 10 may include a purge mode where liquid diluent is passed through the aspirator assembly 12, but each solenoid valve 28-31 is maintained in the closed position whereby liquid diluent is passed through the aspirator assembly 12, outlet conduit 68 and into distribution manifold 46 and one or more of the appliances 76-80 to purge liquid products from conduit 68 and manifold 46. In this manner, a single aspirating dispenser 14 may be used to dispense multiple liquid products 80-83 to two or more appliances such as a washer, dishwasher or a like appliance. As multiple appliances 76-80 are able to receive liquid product 80-83 from a single dispenser, the equipment costs are decreased significantly for providing multiple liquid products to multiple requesting appliances.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for dispensing liquid products to two or more appliances, comprising:

a boost pump having a pump inlet for receiving a stream of liquid diluent at a source pressure and a pump outlet for delivering the stream of liquid diluent at an elevated pressure;

an aspirator having a diluent inlet port for receiving the stream of liquid diluent at the elevated pressure, at least one product inlet port for receiving a liquid product and an outlet port for dispensing the liquid product;

a plurality of distribution valves, each of the distribution valves for directing the liquid product to a corresponding one of the two or more appliances, each of the distribution valves having an inlet connected downstream of and in liquid communication to the outlet port of the aspirator and an outlet connected in liquid communication to the corresponding one of the appliances, wherein more than one of the distribution valve outlets can be in liquid communication with the outlet port of the aspirator simultaneously.

2. The apparatus of claim 1 further comprising a controller connected in communication to each of the distribution valves for issuing an instruction to a selected one of the valves for placing the outlet port of the aspirator in fluid communication with the one of the appliance corresponding to the selected valve.

3. The apparatus of claim 2 further comprising an anti-siphon valve connected in liquid communication between the diluent inlet port of the aspirator and a source for the stream of liquid diluent.

4. The apparatus of claim 3 wherein the anti-siphon valve is a pressure vacuum breaker.

5. The apparatus of claim 4 wherein the distribution valves are normally closed or fail closed valves.

6. A method for dispensing liquid products to two or more appliances, comprising:

providing an aspirator having a diluent inlet port for receiving a stream of liquid diluent, a plurality of product inlet ports for receiving a liquid product and an outlet port for dispensing a liquid product;

passing the stream of liquid diluent at an elevated pressure through the diluent inlet port of the aspirator for aspirating a liquid product from a liquid product source into the aspirator;

providing the liquid product mixed with the diluent from the aspirator to a plurality of normally closed distribution valves, each of the distribution valves corresponding to a corresponding one of the two or more appliances; and simultaneously dispensing the liquid product mixed with the diluent to a selected two of the two or more appliances by placing the outlet port of the aspirator in fluid communication with the selected two of the two or more appliances by opening the distribution valves corresponding with the selected two of the appliances.

7. The method of claim 6 further comprising the step of providing the stream of liquid diluent at a source pressure and increasing the source pressure to an elevated pressure.

8. The method of claim 6 further comprising the step of providing pressure a vacuum breaker connected in liquid communication between the diluent inlet port of the aspirator and a source for the stream of liquid diluent.

* * * * *